(12) United States Patent
Heureux (10) Patent No.: US 7,151,628 B2
(45) Date of Patent: *Dec. 19, 2006

(54) MICROMIRROR ARRAY DEVICE AND A METHOD FOR MAKING THE SAME

(75) Inventor: Peter Heureux, Felton, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/255,045

(22) Filed: Oct. 19, 2005

(65) Prior Publication Data

US 2006/0082861 A1 Apr. 20, 2006

Related U.S. Application Data

(63) Continuation of application No. 10/969,251, filed on Oct. 19, 2004, now Pat. No. 7,092,143.

(51) Int. Cl.
*G02B 26/00* (2006.01)

(52) U.S. Cl. .................. 359/291; 359/223; 359/224
(58) Field of Classification Search ............ 359/291
See application file for complete search history.

(56) References Cited

U.S. PATENT DOCUMENTS

| 6,381,381 B1 | 4/2002 | Takeda et al. |
| 2004/0035821 A1* | 2/2004 | Doan et al. .............. 216/2 |

* cited by examiner

*Primary Examiner*—Timothy Thompson
*Assistant Examiner*—Jerry Fang
(74) *Attorney, Agent, or Firm*—W. James Brady, III; Frederick J. Telecky, Jr.

(57) ABSTRACT

The spatial light modulator of the present invention comprises an array of micromirrors, each of which has a reflective deflectable mirror plate. A set of posts are provided for holding the mirror plates on a substrate, but not all micromirrors of the micromirror array have posts.

23 Claims, 7 Drawing Sheets

MICROMIRROR ARRAY DEVICE AND A METHOD FOR MAKING THE SAME

CROSS-REFERENCE TO RELATED CASES

This U.S. patent application is a continuation of U.S. patent application Ser. No. 10/969,251 filed Oct. 19, 2004 now U.S. Pat. No. 7,092,143 to Heureux, the subject matter being incorporated herein by reference in entirety.

TECHNICAL FIELD OF THE INVENTION

The present invention is generally related to the art of microelectromechanical devices, and more particularly, to micromirror array devices for use in display systems.

BACKGROUND OF THE INVENTION

Micromirror arrays are key components of microelectromechanical system (MEMS)-based spatial light modulators (SLMs). SLMs are transducers that modulate an incident beam of light in a spatial pattern that corresponds to an optical or electrical input. A typical MEMS-based SLM consists of an array of individually addressable micromirrors. Each micromirror consists of a deflectable reflective mirror plate that is attached to a deformable hinge formed on a substrate such that the mirror plate can rotate on the substrate. Each individual mirror plate can be deflected independently by an electrostatic force. The electrostatic force is derived from an electrostatic field established between the mirror plate and an electrode. Reflection of a beam of incident light incident on a micromirror can then be controlled, for example, by deflecting the micromirror through changing the electrostatic force applied to the micromirror. MEMS-based SLM have experienced significant developments and have been implemented in many applications, one of which is the use in digital display systems. In a display application, each micromirror is associated with a pixel of a displayed image. To produce a bright pixel, the state of the micromirror associated with the pixel is set in such a way that the reflected light from the micromirror is directed onto a target for viewing. To produce a dark pixel, the state of the micromirror is tuned such that the reflected light from the micromirror is directed away from the display device. In order to display a black-and-white image, the micromirror array is illuminated by a beam of light. By coordinating the reflective status of the micromirrors based on the brightness of the pixels of the desired image, the collective effect of all reflected lights from individual micromirrors is the generation of the desired image. Gray-scaled and colored images can also be displayed using the micromirror array with the pulse-width-modulation and sequential-color display techniques, which will not be discussed in detail herein.

Variations of the micromirror array, of which the SLM is comprised, have been developed. Regardless of the variations, the micromirror is the key component of an SLM used for display systems and the quality of a displayed image depends on the integrity and function of that micromirror. Therefore, a method and device that will simplify the product and the fabrication thereof is needed.

SUMMARY OF THE INVENTION

The objects and advantages of the present invention will be obvious, and in part appear hereafter and are accomplished by the present invention that provides a method and apparatus for operating pixels of spatial light modulators in display systems. Such objects of the invention are achieved in the features of the independent claims attached hereto. Preferred embodiments are characterized in the dependent claims.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 2b illustrates a cross-section view of another spatial light modulator in FIG. 2a;

DETAILED DESCRIPTION OF THE INVENTION

In the micromirror array device of the present invention, posts are provided for selected micromirrors in the array, whereas all deflectable mirror plates of the micromirror array are supported and held by the provided posts such that the mirror plates can be individually addressed and deflected on a substrate. For this purpose, hinges of the micromirrors are interconnected according to a particular pattern. The posts are distributed across the array of micromirrors and connecting the hinges to the substrate. The locations of the posts can be determined based on the connection pattern of the hinges, as well as the mechanical properties of the hinges and/or the mechanical properties of the hinge connections. As a result, one or more micromirrors in the micromirror array are not provided with a post. The mirror plate and the hinge of such a micromirror are held by the other hinges and the posts. Meanwhile, there can be a micromirror in the micromirror array having at most one post directly connected thereto.

The following description refers to drawings which are based on selected examples for demonstration purposes only and should not be interpreted as a limitation to the present invention. Other variations without departure from the spirit of the present invention are also applicable.

Figure 1:
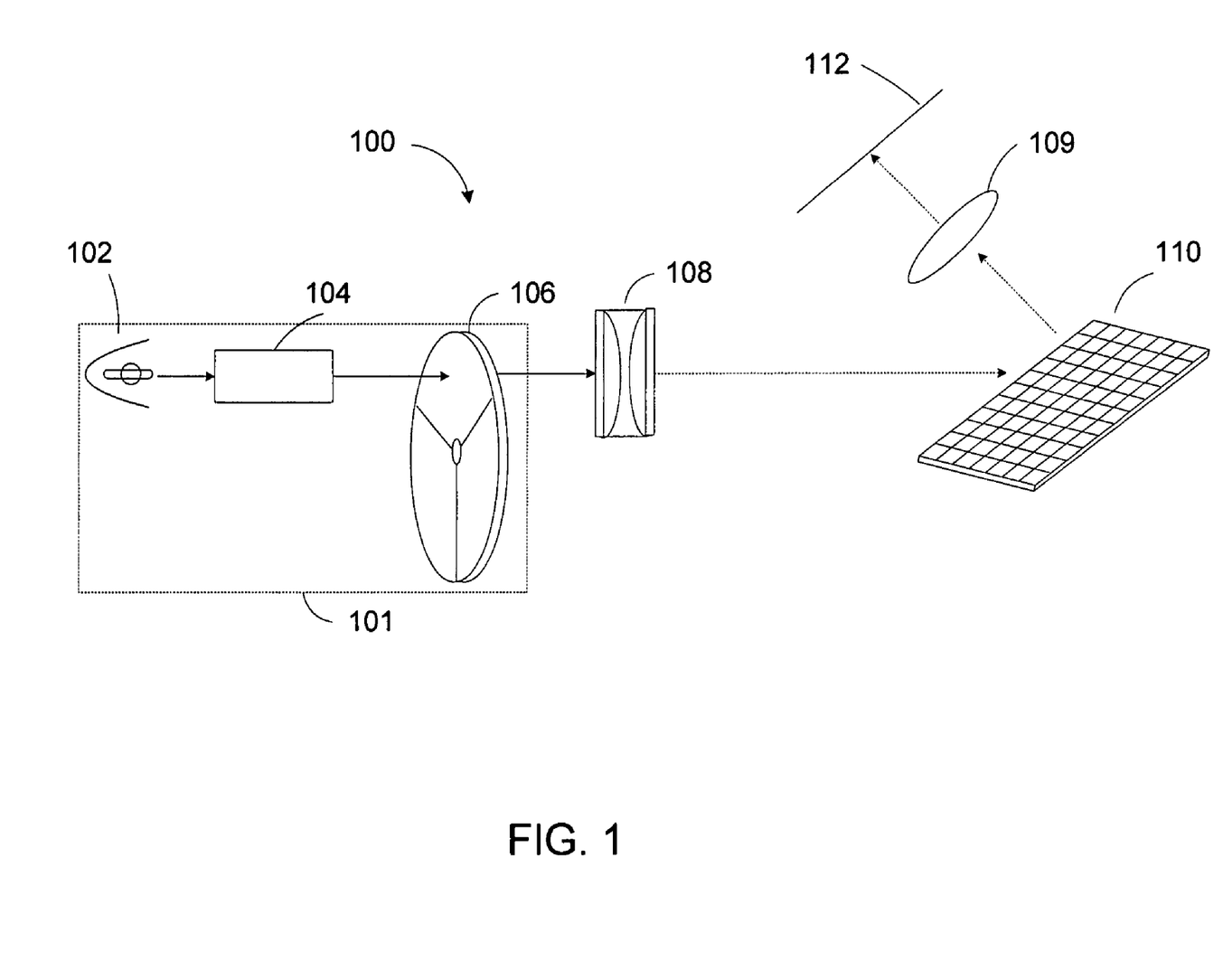
FIG. 1 illustrates an exemplary display system having a spatial light modulator in which embodiments of the invention can be implemented.

The micromirror array device of the present invention has a variety of applications, one of which is in display systems. FIG. 1 presents an exemplary display system that employs a spatial light modulator comprising an array of micromirrors. In its basic configuration, display system 100 comprises light source 102, optical devices (e.g. light pipe 104, condensing lens 108 and projection lens 112), display target 114 and spatial light modulator 110 that further comprises a plurality of micromirror devices (e.g. an array of micromirrors). Light source 102 (e.g. an arc lamp) emits light through the light integrator/pipe 104, color wheel 106 and condensing lens 108 and onto spatial light modulator 110. Though the color wheel is positioned after the light pipe in this example, the color wheel may be positioned before the light pipe as well. The micromirrors of the spatial light modulator 110 are selectively actuated by a controller (e.g. as disclosed in U.S. Pat. No. 6,388,661 issued May 14, 2002, incorporated herein by reference) so as to reflect—when in their "ON" position—the incident light into projection optics 112, resulting in an image on display target 114 (screen, a viewer's eyes, a photosensitive material, etc.). Generally, more complex optical systems are often used, especially in displaying applications for color images.

Figure 2A:
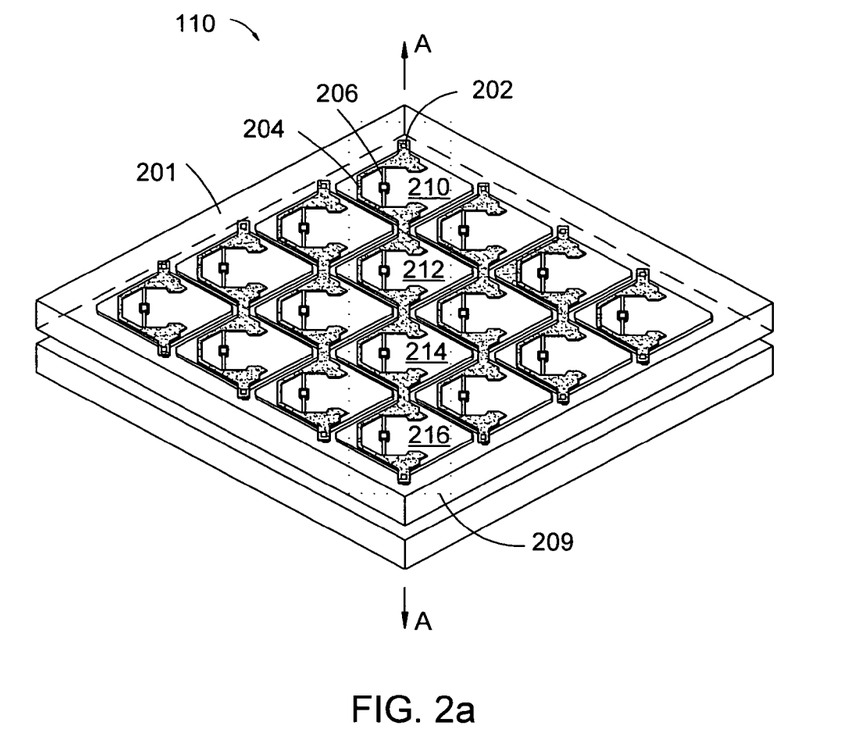
FIG. 2a illustrates a perspective view of a portion of an exemplary spatial light modulator in FIG. 1.

FIG. 2a depicts an example of a micromirror array that can be used for spatial light modulator 110 of FIG. 1. For simplicity purposes, only 4×4 micromirrors are presented. In general, the micromirror array may have millions of micromirrors, especially in display systems. For example, the micromirror array may have 1024×1768, or 1280×1024, or 1600×1024 or even larger numbers of micromirrors.

The micromirror array can be constructed having a pitch (the center-to-center distance between adjacent micromirrors) of 25 micrometers or less, or 10.16 micrometers or less, or from 4.38 to 10.16 micrometers. The gap between adjacent micromirrors is approximately of 0.5 micrometers or less, or from 0.1 to 0.5 micrometer. And the mirror plate of the micromirror has a dimension of from 20 micrometers to 10 micrometers.

In the particular example shown in FIG. 2a, the micromirror array is formed on substrate 201, which can be a light transmissive substrate, such as glass or quartz. Each micromirror comprises a mirror plate (e.g. mirror plate 210) and a hinge (e.g. hinge 206). The mirror plate is attached to the hinge such that the mirror plate can rotate relative to the substrate. The hinge is held by a hinge support (e.g. hinge support 204) on the substrate. The hinge supports of the micromirrors in the array are interconnected along a direction of the micromirror array. For example, the hinge supports of micromirrors 210, 212, 214, and 216 along direction AA are interconnected—forming a hinge support strip (e.g. hinge support strip 209). The hinge support strip as illustrated in the figure is along direction AA, which is a diagonal of the micromirror array. In other embodiments of the invention, the hinge support strips of the micromirror array can be along any desired directions in the plane of the micromirror array. For example, the hinge support strips can be along the edges or along a direction at an angle to the edges of the micromirror array. A micromirror array may have a plurality of hinge support strips that are parallel to each other when viewed from the top, in plan view. Alternatively, the micromirror array may have hinge support strips that are not parallel to each other, which is not shown in the figure.

Figure 2B:
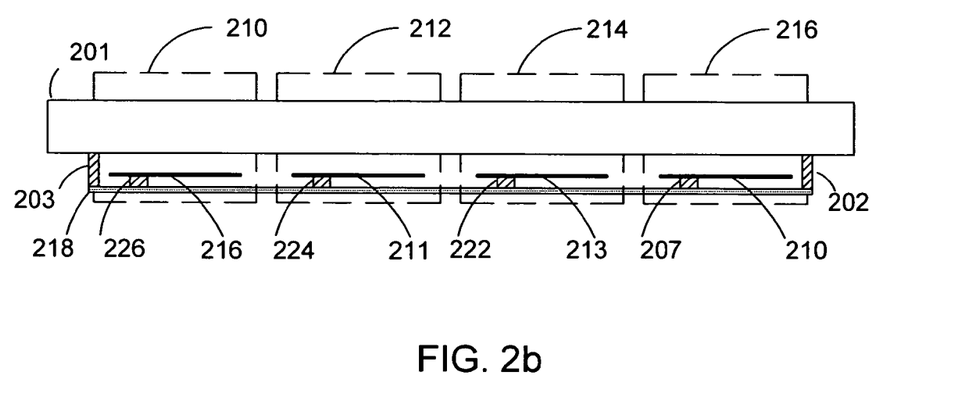

FIG. 2b is a view of a cross-section taken along direction AA of FIG. 2a. The mirror plates of the micromirrors are attached to hinges that are held by hinge supports. For example, mirror plate 210 is attached to a deformable hinge via hinge contact 207. The hinge is held by hinge structure 209 in FIG. 2a. The hinge supports of micromirrors 210, 212, 214, and 216 are interconnected to each other, forming hinge support strip 218. The hinge support strip is supported, held and connected to substrate 201 by posts 202 and 203. Posts 202 and 203 are connected to one end of the hinge structure of micromirror 211 and one end of the hinge structure of micromirror 217 respectively. However, the hinge structures of micromirrors 212 and 214 are not directly connected to a post. That is, the mirror plates 211 and 213 of micromirrors 212 and 214 respectively are connected to the substrate via hinges and hinge supports, the hinge support strip and the posts that are connected to hinge supports of micromirrors other than micromirrors 212 and 214 (e.g. micromirrors 210 and 216). Of course, other arrangements for the posts can also be applied. In particular, posts can be provided for the micromirrors based upon the mechanical properties of the hinge supports. For example, fewer posts need be provided for micromirrors that have rigid hinges or hinge supports.

Figure 3:
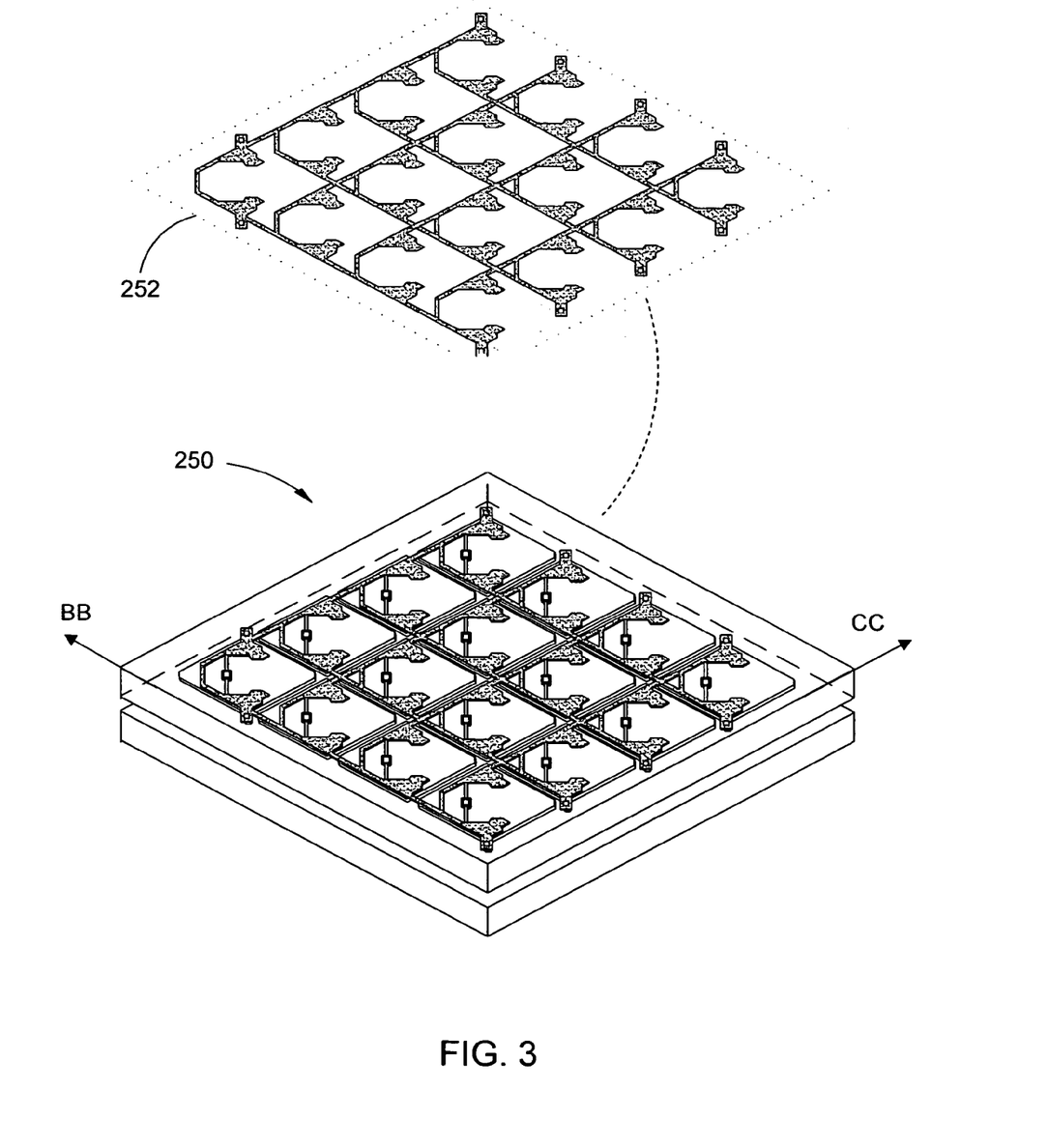
FIG. 3 illustrates a perspective view of another exemplary spatial light modulator according to an embodiment of the invention.

The hinge supports of the micromirrors in the micromirror array may alternatively be interconnected to form a hinge support frame, as shown in FIG. 3. Referring to FIG. 3, the hinge supports of the micromirrors are interconnected in both BB and CC directions—forming a hinge support frame. The BB and CC directions may or may not be perpendicular to each other. The BB and CC directions may or may not be parallel to the edges of the micromirror array. With such a hinge support frame, the mechanical stability and reliability of the micromirror array can certainly be improved.

Though not shown in the figure, the hinge supports of the micromirrors in the micromirror array can be interconnected into hinge-support strips or hinge-support frames, or hinge-support grids, or a combination of the same. The hinge support of a micromirror in an instance may stand alone, not being connected to other hinge supports.

The hinge support strips (frames and grids if any) are supported and held by a plurality of posts on a substrate. The posts are positioned between the hinge support strips (frames or grids if any) on the substrate substrate, and connect the hinge support strips (frames or grids if any) to the substrate. In an embodiment of the invention, each post is connected to a hinge support of a micromirror in the micromirror array. The post may be positioned at one or both ends along an axis of a mirror plate to support the hinge support (i.e. hinge support 304 in FIG. 4 or hinge support 324 in FIG. 5). However, not all the individual hinge support structures of the micromirrors in the micromirror array are directly connected to one or two posts. For example, a hinge support of a micromirror may have only one post connecting the hinge support to, and supporting the hinge support on, the substrate, or a micromirror may have no posts formed thereon. In this instance, the hinge and the hinge support holding the hinge is supported by the hinge support strip (and/or the hinge support frame) to which the hinge support having no post is connected.

According to the invention, posts are provided for the hinge supports of selected micromirrors in a micromirror array only. Specifically, the micromirrors to be provided with posts can be selected according to a predetermined criterion. As a way of example, the criterion can be: posts are provided for every particular number m of micromirrors along a given direction (e.g. a diagonal of the micromirror array or any direction defined by the configuration of the hinge structures of the micromirrors); or posts are provided for micromirrors that are randomly selected from the micromirror array; or posts are provided and distributed based upon the mechanical properties of the hinge supports and/or the hinge strips (or frames or grids if any).

As a way of example, the micromirror array may have a plurality of first micromirrors provided with at least two posts, and a plurality of second micromirrors provided with less than two posts, wherein the ratio of the number of first micromirrors to the second micromirrors is 1:2 or less, such as 1:3, or 1:4, or 1:5. As another example, the total number of micromirrors having at least two posts is approximately 90% or less, such as 80% or less, or 70% or less, or 60% or less, or 50% or less, or even 40% or less, of the total number of the micromirrors in the micromirror array. As yet another example, the total number of micromirrors having no post can be approximately 5% or more, such as 10% or more, 30% or more, or 50% or more of the total number of micromirrors in the micromirror array. Alternatively, the number of micromirrors each having at least one post is approximately 90% or less, such as 80% or less, or 70% or less, or 50% or less, or 45% or less of the total number of the micromirror provided with no post is approximately 90% or less, such as 80% or less, or 70% or less, or 50% or less, or 45% or less, or 30% or less.

In another example, the micromirror array comprises a group of first micromirror devices each of which comprises a deflectable reflective mirror plate, a deformable hinge, and at least two posts for holding the mirror plate and hinge above a substrate; a group of second micromirror devices each of which comprises a deflectable mirror plate, a deformable hinge, and at most one post for holding the mirror plate and hinge above a substrate; wherein a ratio of the numbers of the first micromirrors to the second micromirrors is 1:2 or less. The number of the first micromirrors can be 70% or less, such as 50% or less, 30% or less, of the total number of micromirrors in the micromirror array. The number of the second micromirrors can be 50% or more of the total number of micromirrors in the micromirror array. The group of the second micromirrors may further comprises a subgroup of third micromirrors each of which having no post, and a subgroup of fourth micromirrors each of which has a single post, wherein the number of the third micromirrors is 10% or less of the total number of the second micromirrors in the group. The number of the third micromirrors can be 5% or less, such as 1% or less of the total number of the second micromirrors in the group. The number of the fourth micromirrors can be 95% or more, 85% or more, 75% or more of the total number of the second micromirrors in the group.

In a micromirror array, the ratio of the total number of posts to the total number n of mirror plates is preferably less than $(n+1)/n$, such as less than $(n+1)/2n$.

In operation, illumination light is directed to the mirror plates of the micromirrors where the illumination is modulated so as to, for example, producing a desired image. The illumination light, however may be scattered by the portion of the posts exposed to the illumination light, generating undesired scattered light. In display applications, such scattered light reduces the contrast ratio, thus degrading the quality of the displayed images. For this reason, the posts, at least the portions exposed to the illumination light of the posts are coated with a light absorbing material.

Figure 4:
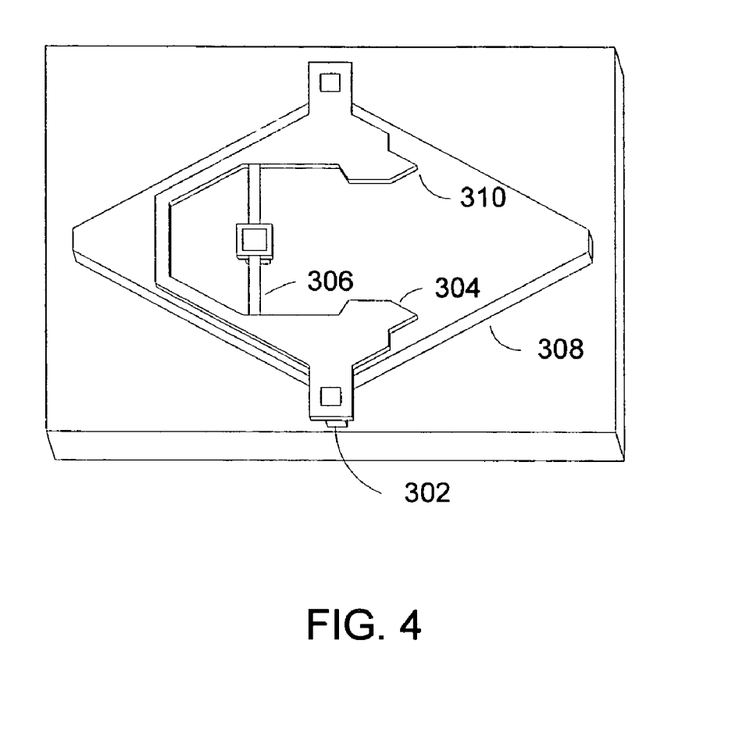
FIG. 4 illustrates an exemplary micromirror.
Figure 5:
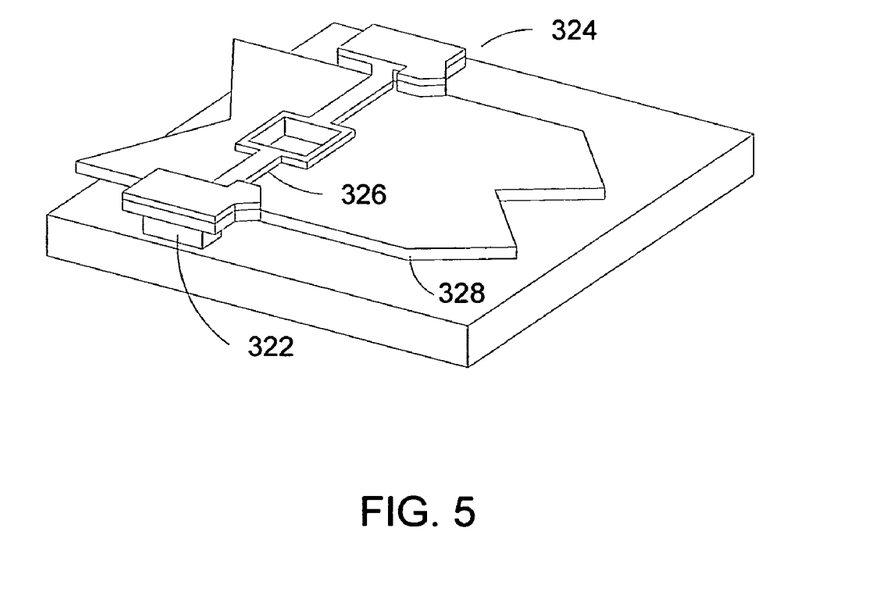
FIG. 5 illustrates another exemplary micromirror.

The micromirrors of a micromirror array as those in FIGS. 2A and 3 may have a variety of configurations, one of which is shown in FIG. 4. This particular example is shown with two posts 302, one on each end of a hinge support 304, which supports hinge 306. Hinge support 304 operates on a diagonal axis of the mirror plate of the micromirror. Its location above the central axis of the mirror plate allows it to rotate asymmetrically, that is, it is able to deflect to a larger angle in one direction than another. Variations of stopping mechanisms may also be used to control the angle to which the mirror deflects, such as tip 310, in this example. FIG. 5 depicts yet another embodiment of a micromirror, in a different shape and structure. Differing from the mirror plate in FIG. 3a, the mirror plate has jagged edges. One benefit of these jagged edges is that it decreases the amount of light scatter.

The micromirrors of the micromirror array each have a mirror plate and a hinge to which the mirror plate is attached such that the mirror plate can rotate relative to a substrate. The hinge can be formed underneath the mirror plate in relation to the incident light. Specifically, the mirror plate can be positioned between the hinge and the light transmissive substrate. This configuration has many advantages. For example, because the hinge is located underneath the mirror plate, it is not exposed to the incident light. Therefore, unexpected light scattering from the hinge can be avoided. Quality of the displayed images, such as the contrast ratio of the displayed images can be improved as compared to the micromirrors having exposed hinges.

In accordance with an embodiment of the invention, the mirror plate is attached to the hinge such that the mirror plate and the hinge are located in different planes parallel to the substrate and is operable to rotate asymmetrically. Specifically, the mirror plate rotates to a larger angle (e.g. the ON state angle when operates in a binary state mode having the ON state and OFF state) in one direction than in another. For this purpose, the mirror plate can be attached to the hinge such that the attachment point is not at or around the geometric center of the mirror plate. The rotation axis of the mirror plate can be parallel to but offset from a diagonal of the mirror plate when viewed from the top of the substrate on which the micromirror is formed. Of course, other configurations wherein the mirror plates rotate symmetrically are also applicable.

For individually deflecting the micromirrors of the micromirror array, an array of electrodes and circuitry can be provided with each electrode being associated with a micromirror. In operation, electrostatic fields are established between the mirror plates of the micromirrors and the electrodes associated with the respective micromirrors, such that the mirror plates can be deflected in response to electrostatic forces derived from said electrostatic fields. In one embodiment, the electrodes and circuitry can be formed on a semiconductor substrate that is disposed at a specified distance proximate to the substrate on which the micromirrors are formed. Alternatively, the array of micromirrors and the array of electrodes and circuitry can be formed on the same substrate, such as on a semiconductor substrate.

A demonstrative fabrication process for making the micromirror and the micromirror array of the present invention will be discussed in the following with references to FIG. 6a to FIG. 6c. U.S. patent application Ser. No. 09/910,537 filed on Jul. 20, 2001, and 60/300,533 filed on Jun. 22, 2001, both to Reid, contain examples of materials that may be used for the various components of the present invention. These patent applications are also incorporated herein by reference. The exemplary processes are for demonstration purposes only and should not be interpreted as limitations to the scope of the invention. In particular, although not limited thereto, the exemplary micromirror is formed on a glass substrate that is transparent to visible light, and electrodes and circuitry are formed on a separate substrate, such as a silicon wafer. However, alternatively, the micromirror and the electrodes and circuitry may be formed on the same substrate, without exceeding the scope of the invention or altering the essence of the invention. For example, the micromirror substrate can be formed on a transfer substrate that is light transmissive. Specifically, the micromirror plate can be formed on the transfer substrate and then the micromirror substrate along with the transfer substrate is attached to another substrate such as a light transmissive substrate followed by removal of the transfer substrate and patterning of the micromirror substrate to form the micromirror.

Figure 6A:
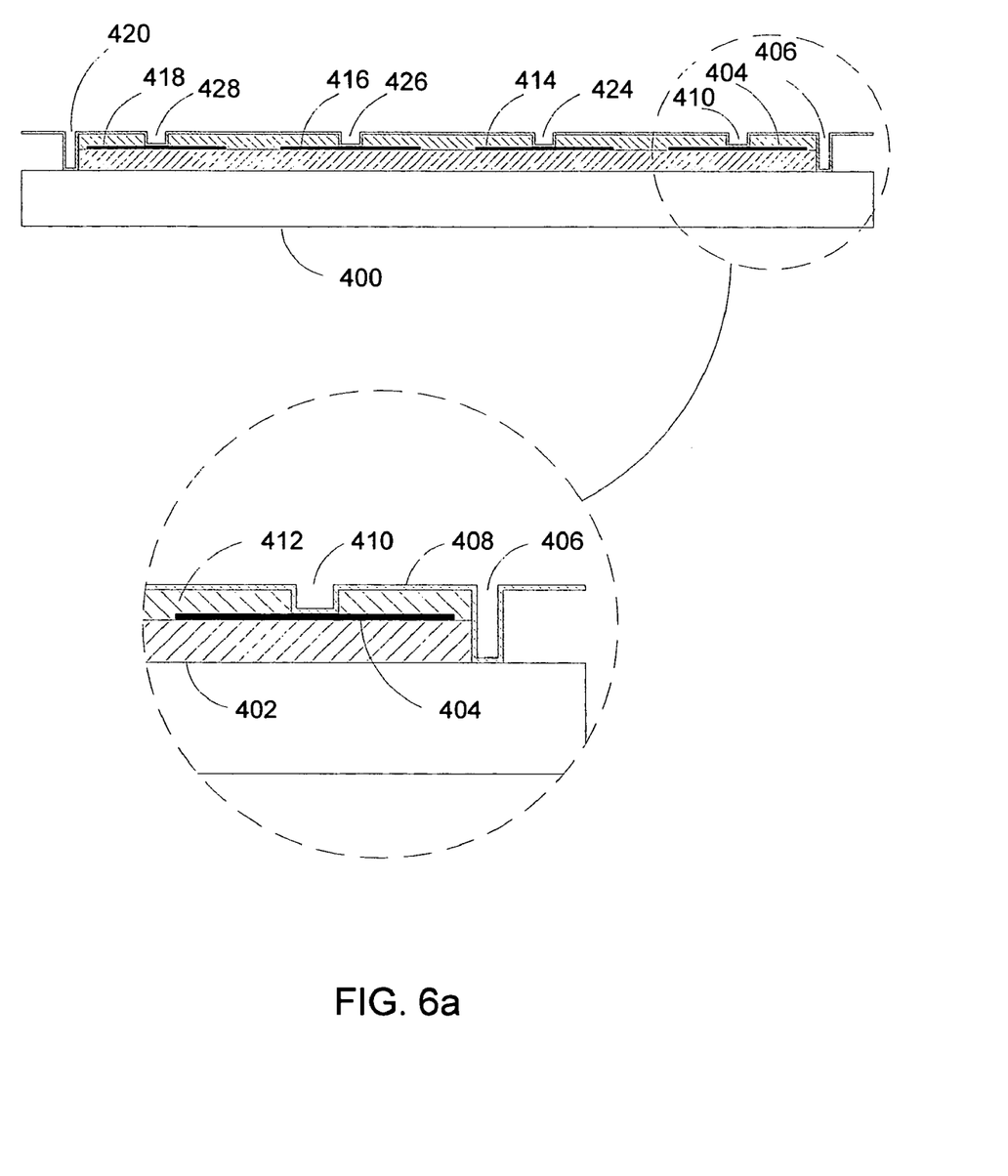
FIG. 6a to 6c illustrates cross-section views of the micromirror in FIG. 2b during an exemplary fabrication process.

FIG. 6a illustrates a cross-section view of the exemplary micromirror array in FIG. 2b. The micromirror array is formed on substrate 400, which is transparent to visible light (e.g. glass, 1737F, Eagle 2000, quartz, Pyrex™, and sapphire). First sacrificial layer 402 is deposited on substrate 400. First sacrificial layer 402 may be any suitable material, such as amorphous silicon, or could alternatively be a polymer or polymide, or even polysilicon, silicon nitride, silicon dioxide and tungsten, depending upon the choice of sacrificial materials, and the etchant selected. In the embodiment of the invention, the first sacrificial layer is amorphous silicon, and it is preferably deposited at 300–350° C. The thickness of the first sacrificial layer can be wide-ranging depending upon the size of the micromirror and the desired tilt angle of the micromirror, though preferred is a thickness of from 500 Å to 50,000 Å, preferably close to 25,000 Å. The first sacrificial layer may be deposited on the substrate using any suitable method, such as LPCVD or PECVD.

As an optional feature of the embodiment, an anti-reflection film may be deposited on the surface of substrate 400. The anti-reflection film is deposited for reducing the reflection of the incident light from the surface of the substrate. Of course, other optical enhancing films may be deposited on either surface of the glass substrate, as desired. In addition to the optical enhancing films, an electrode may be formed on a surface of substrate 400. The electrode can be formed as an electrode grid or a series of electrode segments (e.g. electrode strips) around the mirror plate. Alternatively, the electrode can be formed as an electrode film on the surface of substrate 400, in which case, the electrode film is transparent to visible light. The electrode can be used for driving the mirror plate to either the ON state or the OFF state. Alternatively, a light-absorbing grid can be deposited on a surface of the glass substrate and around or below each micromirror. The light-absorbing frame absorbs incident light that reaches the substrate and/or light scattered from the edges of the micromirrors. By preventing unwanted reflection of light off the substrate, the absorption of the scattered light improves the quality of performance, such as the contrast ratio, of the micromirror.

After depositing the first sacrificial layer, the mirror plates of micromirrors, such as mirror plates 404, 414, 416 and 418, are formed, the hinge supports of which are interconnected, such as in a hinge support strip in this example or alternatively a frame. The mirror plates are deposited and patterned on the first sacrificial layer. Because the micromirrors are designated for reflecting incident light in the spectrum of interest (e.g. the visible light spectrum), it is preferred that the micromirror plate layer comprises one or more materials that exhibit high reflectivity (preferably 90% or higher) to the incident light. The thickness of the micromirror plates can be wide-ranging, depending upon the desired mechanical properties (e.g. the elastic module), the size of the micromirror, the desired ON state angle and OFF state angle, the electronic properties (e.g. the conductivity) of the mirror plates and the properties of the materials selected for forming the micromirror plates. According to the invention, a thickness from 500 Å to 50,0000 Å, preferably around 2,500 Å, is preferred for the mirror plates. In the given embodiment of the invention, the mirror plates are a multi-layered structure, which comprises a $SiO_x$ layer with a preferred thickness around 400 Å, a light-reflecting layer of aluminum with a preferred thickness around 2,500 Å, a titanium layer with a preferred thickness around 80 Å, and a 200 Å $TiN_x$ layer. In addition to aluminum, other materials, such as Ti, AlSiCu and TiAl, having high reflectivity to visible light may also be used for the light-reflecting layer. These mirror plate layers can be deposited by PVD at a temperature preferably around 150° C.

After deposition, mirror plates 404, 414, 416, and 418 are patterned into desired shapes, such as the shapes depicted in FIG. 3*a* or FIG. 3*b*. The patterning of the micromirrors can be achieved using standard photoresist patterning followed by etching, using for example $CF_4$, $Cl_2$, or other suitable etchant depending upon the specific material of the micromirror plate layer.

After patterning the mirror plates, second sacrificial layer 412 is deposited on first sacrificial layer 402 and mirror plates 404, 414, 416 and 418. The second sacrificial layer may comprise amorphous silicon, or could alternatively comprise one or more of the various materials mentioned above in reference to the first sacrificial layer. First and second sacrificial layers need not be the same, although they are the same in the preferred embodiment so that, in the future, the etching process for removing these sacrificial materials can be simplified. As with the first sacrificial layer, the second sacrificial layer may be deposited using any suitable method, such as LPCVD or PECVD. In the embodiment of the invention, the second sacrificial layer comprises amorphous silicon deposited at approximately 350° C. The thickness of the second sacrificial layer can be on the order of 12,000 Å, but may be adjusted to any reasonable thickness, such as between 2,000 Å and 20,000 Å, depending upon the desired distance (in the direction perpendicular to the micromirror plate and the substrate) between the micromirror plate and the hinge. It is preferred that the hinge and mirror plate be separated by a gap of a distance from 0.1 to 1.5 microns, more preferably from 0.1 to 0.45 micron, and even more preferably from 0.25 to 0.45 micron. Larger gaps could also be used, such as a gap from 0.5 to 1.5 micrometers, or from 0.5 to 0.8 micrometer, or from 0.8 to 1.25 micrometers, or from 1.25 to 1.5 micrometers.

In the preferred embodiment of the invention, the micromirror plates comprise aluminum, and the sacrificial layers (e.g. the first and second sacrificial layer) are amorphous silicon. This design, however, can cause defects due to the diffusion of the aluminum and silicon, especially around the edge of the mirror plate. To solve this problem, a protection layer (not shown) may be deposited on the patterned micromirror plate before depositing the second sacrificial silicon layer, such that the aluminum layer can be isolated from the silicon sacrificial layer. This protection may or may not be removed after removing the sacrificial materials. If the protection layer is not to be removed, it is to be patterned, after deposition on the mirror plate.

The deposited second sacrificial layer is then patterned to form two deep-via areas 406 and 420 (for the posts, such as posts 202 and 203 respectively in FIG. 2*b*) and shallow-via areas 410, 424, 426 and 428 (for the hinge contacts, such as hinge contacts 207, 224, 226 and 228 in FIG. 2*b*), using standard lithography technique followed by etching, as shown in the figure. For simplicity and demonstration purposes, the shallow-via areas may appear to be centered with respect to the mirror plates; however, the shallow-via areas should be positioned, with respect to the mirror plates, based on the design of the micromirror and the location of the hinge contact thereof. For example, based on the embodiment of the micromirror array in FIG. 2*b*, the shallow-via areas would be located asymmetrically with respect to the center of the mirror plates and should be formed as such. The etching step may be performed using $Cl_2$, $BCl_3$, or other suitable etchant depending upon the specific material(s) of the second sacrificial layer. The distance from one deep-via area to the next depends upon the length of the defined hinge support strip or pattern. Deep-via areas should not be formed between two adjacent mirror plates of micromirrors connected to the hinge support strip in the given embodiment, since there are no posts provided between two adjacent micromirrors, only one post at each end of the hinge support strip to which the micromirrors are connected. For simplicity and demonstration purposes, only 4 micromirrors are shown in the cross-section of this fabrication process in FIG. 4a; however, the deep-via areas should be positioned, with respect to the micromirrors and with one another, based on the design of the micromirror array and the pattern of posts provided to support the hinge supports of the micromirrors. In order to form the shallow-via area, an etching step using $CF_4$ or other suitable etchant may be executed. The shallow-via area, which can be of any suitable size, is preferably on the order of 2.2 square microns in area in cross-section, in the plane parallel to the mirror plate and substrate in the embodiment, and the size of each deep-via is approximately 1.0 square micron in area in cross-section, in the plane parallel to the mirror plate and substrate in the embodiment.

After patterning the second sacrificial layer, hinge support layer 408 is deposited on the patterned second sacrificial layer. Because the hinge support is designated for holding the hinge and the micromirror plate, it is desired that the hinge support layer comprises materials having a large elastic modulus. According to an embodiment of the invention, hinge support layer 408 comprises a $TiN_x$ layer of a thickness of 400 Å (although it may comprise $TiN_x$, and may have a thickness between 100 Å and 2,000 Å) deposited by PVD, and a $SiN_x$ layer of a thickness of 3500 Å (although the thickness of the $SiN_x$ layer may be between 2,000 Å and 10,000 Å) deposited by PECVD. Of course, other suitable materials and methods of deposition may be used (e.g. LPCVD or sputtering.) The $TiN_x$ layer is not necessary for the invention, but it provides a conductive contact surface between the micromirror and the hinge in order to reduce charge-induced stiction.

After the deposition, hinge support layer 408 is patterned into a desired configuration, such as that of hinge support strip 209 in FIG. 2a, or that of hinge support frame 252 in FIG. 3 or any other number of possible configurations, not specifically listed herein. An etching step using one or more proper etchants is executed in patterning the hinge support layer. In particular, the layer can be etched with a chlorine chemistry or a fluorine chemistry where the etchant is a perfluorocarbon or hydrofluorocarbon or $SF_6$ that is energized so as to etch selectively the hinge support layers both chemically and physically (e.g. a plasma/RIE etch with $CF_4$, $CHF_3$, $C_3F_8$, $CH_2F_2$, $C_2F_6$, $SF_6$, etc. or more likely combinations of the above or with additional gases, such as $CF_4/H_2$, $SF_6/Cl_2$, or gases using more than one etching species such as $CF_2Cl_2$, all possibly with one or more optional inert diluents.) Different etchants may, of course, be employed for etching each hinge support layer (e.g. chlorine chemistry for a metal layer, hydrocarbon, or fluorocarbon or $SF_6$ plasma for silicon or silicon compound layers, etc.)

Figure 6B:
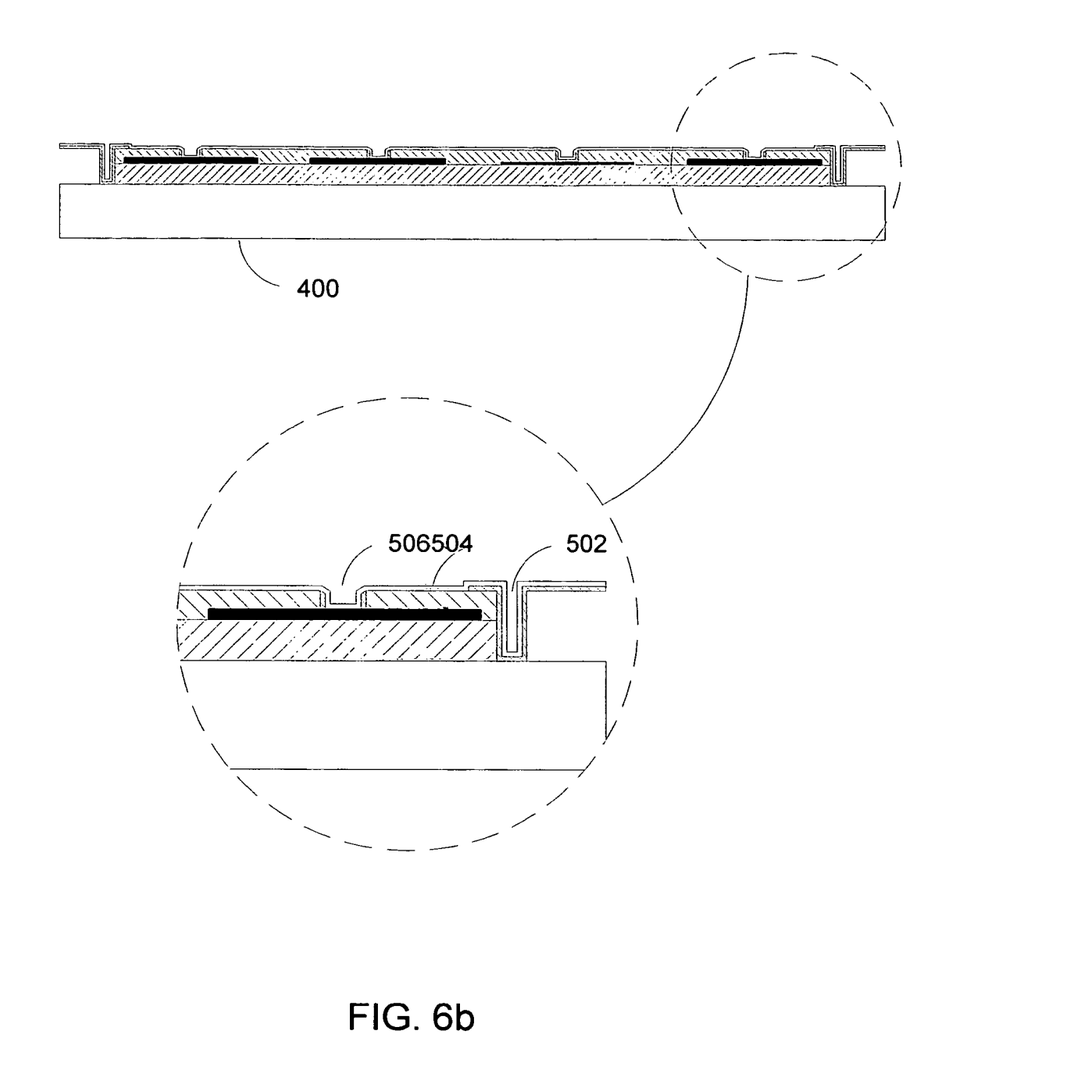
Figure 6C:
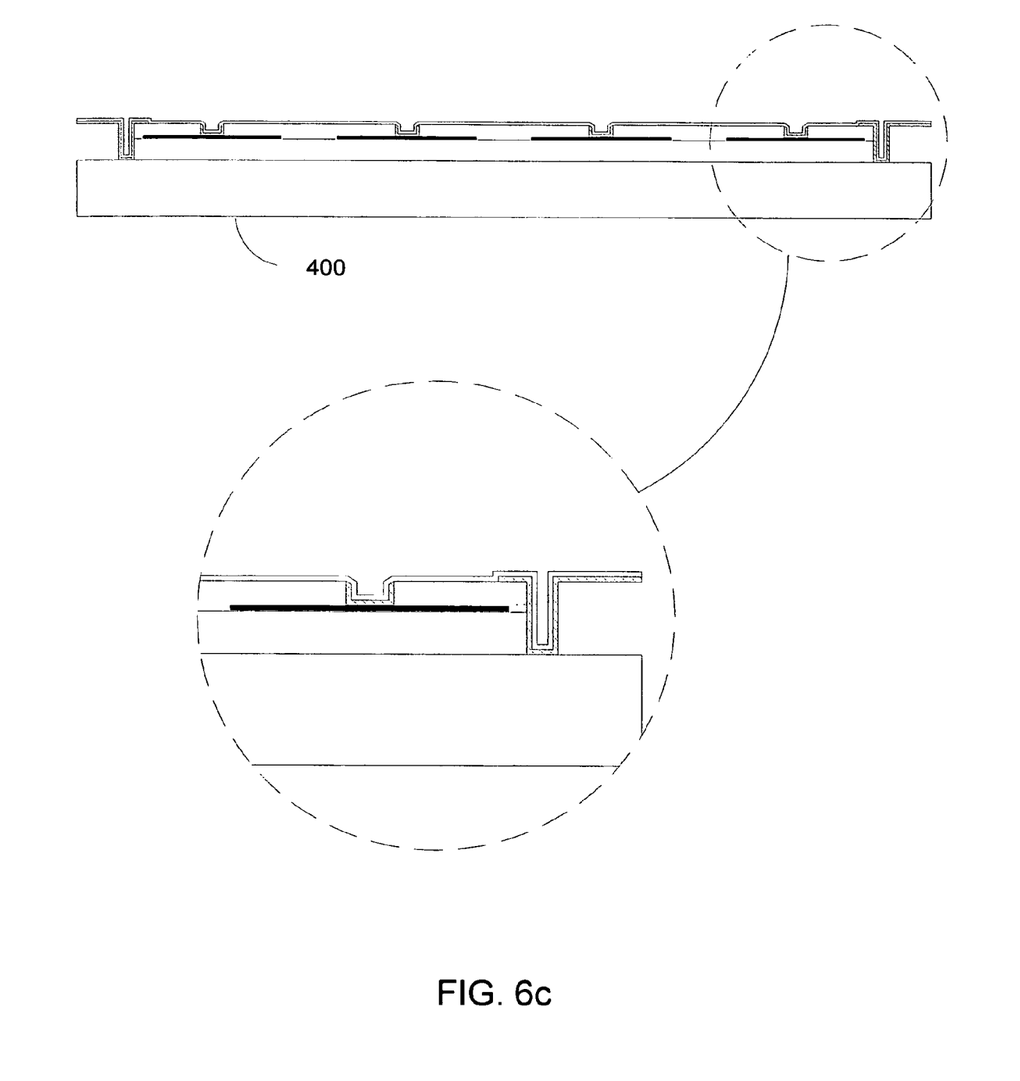

Referring to FIG. 6b, after patterning the hinge support layer, the bottom segment of contact areas, such as contact area 506, is removed and a part of the micromirror plate underneath the contact area is thus exposed to hinge layer 504, which is deposited on the patterned hinge support layer, to form an electric contact with external electric source. The sidewalls of contact area 506 are left with residues of the hinge support layers after patterning. The residue on the sidewalls helps to enhance the mechanical and electrical properties of the hinge. When selected adjacent micromirrors do share a post, a deep-via area of one micromirror can form a continuous element with a deep-via area corresponding to the adjacent micromirror in an array. Only one deep-via area would need to be formed between said micromirrors. Of course, where there is no post, no deep-via area would be formed.

In the embodiment of the invention, the hinge layer is also used as an electric contact for the micromirror plate. It is desired that the material of the hinge layer is electrically conductive. Examples of suitable materials for the hinge layer are silicon nitride, silicon oxide, silicon carbide, polysilicon, Al, Ir, titanium, titanium nitride, titanium oxide(s), titanium carbide, $CoSiN_x$, $TiSiN_x$, $TaSiN_x$, or other ternary and higher compounds. When titanium is selected for the hinge layer, it can be deposited at 100° C. Alternatively the hinge layer may comprise multi-layers, such as 100 Å of $TiN_x$ and 400 Å of $SiN_x$.

After deposition, the hinge layer is then patterned as desired using etching. As with the hinge support layer, the hinge layer can be etched with a chlorine chemistry or a fluorine chemistry where the etchant is a perfluorocarbon or hydrofluorocarbon or $SF_6$ that is energized so as to etch selectively the hinge layers both chemically and physically (e.g. a plasma/RE etch with $CF_4$, $CHF_3$, $C_3F_8$, $CH_2F_2$, $C_2F_6$, $SF_6$, etc. or more likely combinations of the above or with additional gases, such as $CF_4/H_2$, $SF_6/Cl_2$, or gases using more than one etching species such as $CF_2Cl_2$, all possibly with one or more optional inert diluents.) Different etchants may, of course, be employed for etching each hinge layer (e.g. chlorine chemistry for a metal layer, hydrocarbon or fluorocarbon or $SF_6$ plasma for silicon or silicon compound layers, etc.)

After the hinge is formed, the micromirror is released by removing the sacrificial materials of the first and second sacrificial layers. A view of the cross-section of the released micromirror device is presented in FIG. 6c. The removal of the first and second sacrificial layers and the following release of the micromirror device permit the mirror plate to deflect, when so driven by the electrodes.

In order to remove efficiently the sacrificial material (e.g. amorphous silicon), the release etching utilizes an etchant gas capable of spontaneous chemical etching of the sacrificial material, preferably isotropic etching that chemically (and not physically) removes the sacrificial material. Such chemical etching and apparatus for performing such chemical etching are disclosed in U.S. patent application Ser. No. 09/427,841 to Patel et al. filed Oct. 26, 1999, and in U.S. patent application Ser. No. 09/649,569 to Patel et al. filed Aug. 28, 2000, the subject matter of each being incorporated herein by reference. Preferred etchants for the release etch are gas phase fluoride etchants that, except for the optional application of temperature, are not energized. Examples include HF gas, noble gas halides such as xenon difluoride, and interhalogens such as $IF_5$, $BrCl_3$, $BrF_3$, $IF_7$ and $ClF_3$. The release etch may comprise inner gas components such as $N_2$, Ar, Xe, He, etc. In this way, the remaining sacrificial material is removed and the micromechanical structure is released. In one aspect of such an embodiment, $XeF_2$ is provided in an etching chamber with diluents (e.g. $N_2$ and He.) The concentration of $XeF_2$ is preferably 8 Torr, although the concentration can be varied from 1 Torr to 30 Torr or higher. This non-plasma etch is employed for preferably 900 seconds, although the time can vary from 60 to 5000 seconds, depending on temperature, etchant concentration, pressure, quantity of sacrificial material to be removed, or other factors. The etch rate may be held constant at 18 Å/s/Torr, although the etch rate may vary from 1 Å/s/Torr to 100 Å/s/Torr. Each step of the release process can be performed at room temperature.

In addition to the above etchants and etching methods mentioned for use in either the final release or in an intermediate etching step, there are others that may also be used by themselves or in combination. Some of these include wet etches, such ACT, KOH, TMAH, HF (liquid); oxygen plasma, $SCCO_2$, or supercritical $CO_2$ (the use of supercritical $CO_2$ as an etchant is described in U.S. patent application Ser. No. 10/167,272, which is incorporated herein by reference.) However, spontaneous vapor phase chemical etchants are more preferred because the sacrificial material, such as amorphous silicon, can be removed more efficiently in small gaps between adjacent mirror plates and the lateral gap between layers, in comparison to the efficiency of the removal of other sacrificial materials (e.g. organic materials) via other etching methods. Though said etching method is not required in all embodiments of the present invention, a micromirror array with very small gaps, a small pitch, and a small distance between the hinge and the mirror plate can be more easily fabricated with such spontaneous vapor phase chemical etchants.

It will be appreciated by those skilled in the art that a new micromirror array device has been described herein. In view of the many possible embodiments to which the principles of this invention may be applied, however, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. In particular, other protective materials, such as inert gas, may be filled in the space formed by the package substrate and the cover substrate. Therefore, the invention as described herein contemplates such embodiments as may come within the scope of the following claims and equivalents thereof. In the claims, only elements denoted by the words "means for" are intended to be interpreted as means plus function claims under 35 U.S.C. §112, the sixth paragraph.

I claim:

1. A device comprising:
    a substrate;
    an array of reflective mirror plates held on the substrate, each of which is attached to a deformable hinge that is connected to a hinge support, wherein the hinge supports in the array are interconnected in first and second directions in a grid parallel to the substrate; and
    an array of electrodes for addressing and electrostatically deflecting the mirror plates.

2. The device of claim 1, wherein the first and second directions are perpendicular to each other.

3. The device of claim 1, wherein the first and second directions are not perpendicular to each other.

4. The device of claim 1, wherein the first or second direction is parallel to an edge of the mirror plate array.

5. The device of claim 1, wherein the first direction is parallel to an edge of the mirror plate array; and the second direction is parallel to another edge of the mirror plate array.

6. The device of claim 1, wherein the hinge supports are connected into a hinge support frame.

7. The device of claim 1, wherein only a portion of the hinge supports are interconnected.

8. The device of claim 1, wherein all of the hinge supports are interconnected.

9. The device of claim 1, further comprising a number of posts that connect the hinge supports to the substrate, wherein at least one of the hinge support is not directly connected to one of the number of posts.

10. The device of claim 1, further comprising a number of posts that connect the hinge supports to the substrate, wherein a ratio of the total number of posts and total number N of mirror plates in the array is less than (N+1)/N.

11. The device of claim 1, wherein the deformable hinges and reflective mirror plates are in separate planes parallel to the substrate.

12. The device of claim 1, wherein the interconnected hinge supports and reflective mirror plates are in separate planes parallel to the substrate.

13. The device of claim 1, wherein the mirror plate is attached to the deformable hinge at an attachment point that is substantially away from the center of the mirror plate such that the mirror plate is capable of rotating asymmetrically.

14. The device of claim 1, wherein the mirror plate is attached to the deformable hinge at an attachment point that is substantially at the center of the mirror plate such that the mirror plate is capable of rotating symmetrically.

15. The device of claim 1, wherein the substrate is transmissive to visible light.

16. The device of claim 15, wherein the substrate is glass, quartz, or sapphire.

17. The device of claim 15, wherein the substrate is glass.

18. The device of claim 17, wherein the electrode is formed on a semiconductor substrate.

19. The device of claim 1, wherein the substrate is a semiconductor substrate on which the electrode is formed.

20. A projection system, comprising:
    an illumination system providing illumination light;
    a spatial light modulator comprising the device of claim 1 for modulating the illumination light; and
    a projection lens for projecting the modulated light onto a screen.

21. The projection system of claim 20, wherein the illumination system comprises an arc lamp, a lightpipe, and a color wheel.

22. The projection system of claim 21, wherein the color wheel is positioned between the arc lamp and the lightpipe along a propagation path of the illumination light.

23. The projection system of claim 21, wherein the color wheel is positioned after the arc lamp and the lightpipe along a propagation path of the illumination light.

* * * * *